United States Patent [19]
Hwang

[11] Patent Number: 5,351,941
[45] Date of Patent: Oct. 4, 1994

[54] CONSTANT FORCE SPRING SYSTEM

[76] Inventor: Paul C. Hwang, 1650 S. 308th St., Apt 17, Federal Way, Wash. 98003

[21] Appl. No.: 106,425

[22] Filed: Aug. 13, 1993

[51] Int. Cl.⁵ .............................................. F16F 1/06
[52] U.S. Cl. .................................... 267/155; 267/172; 242/342; 360/132
[58] Field of Search ............... 267/277, 275, 155, 172, 267/179; 242/192; 360/132

[56] References Cited

U.S. PATENT DOCUMENTS

| | | | |
|---|---|---|---|
| 3,446,529 | 5/1969 | Mills | 267/155 X |
| 4,986,678 | 1/1991 | Hwang | 400/208 |
| 4,990,008 | 2/1991 | Hwang | 400/208 |
| 4,998,833 | 3/1991 | Chiman | 400/208 |
| 5,084,799 | 1/1992 | Moo Yeol et al. | 360/132 |

Primary Examiner—Robert J. Oberleitner
Assistant Examiner—Kevin D. Rotherford
Attorney, Agent, or Firm—Robert W. Jenny

[57] ABSTRACT

A constant force spring system having a coil spring with first and second arms, a ramp for the second arm to contact and a pin mounted on a base. The coil spring is mounted on the pin and the ramp is positioned such that the second arm of the spring contacts the sloped surface of the ramp. When a force is applied to the first arm of the spring it tends to move the second arm up the sloped ramp. This interaction of the second arm and sloped surface produces a reaction force. The slope angle and ramp configuration is configured such that there are equal and opposite forces produced by the spring system.

2 Claims, 2 Drawing Sheets

5,351,941

CONSTANT FORCE SPRING SYSTEM

BACKGROUND OF THE INVENTION

1. FIELD

The subject invention is in the field of constant force springs and spring systems, otherwise known as flat rate springs and spring systems. In particular, it is in the field of such springs and spring systems used in applications in which the deflections of the spring or spring system occur slowly, such as in film and tape cartridges.

2. PRIOR ART

There is much prior art in this general field. There is relatively limited prior art in the particular field in which there are size, shape and space constraints. Examples of the particular prior art are shown in the following U.S. Patents, all issued to the inventor of the subject invention.

| 4,986,678 | 4,990,008 | 4,998,833 |
|---|---|---|

The spring systems disclosed in these patents require adjustments during use in tape and film cartridges in order to keep the spring forces constant within desired limits as the tape or film is transferred from spool to spool. Accordingly, the primary objective of the subject invention is to provide a spring system which has an essentially flat rate over its entire working deflection. A second objective is that the subject system be adaptable to use in the confined and limited space in film and tape cartridge.

SUMMARY OF THE INVENTION

The subject invention is a flat rate spring system, i.e. the force required to deflect the system through its working deflection range is essentially constant. The primary spring system element is a coil of spring wire used in the torsion mode. The coil comprises a plurality of turns and has a cylindrical shape. An arm of the spring wire extends from the turn at a first end of the spring, in the plane of that turn and effectively tangential to the cylindrical shape. The turn at the other end of the coil has an increasing radius over 180°, giving it a spiral configuration and a second arm of spring wire extends from the end of the spiral. The first arm is termed the working arm. The second arm is termed the reaction arm.

The coil is mounted on a cylindrical stub shaft extending from a flat base, with the working arm farthest from the base. The spring fits closely around the shaft.

The second element of the system is an inclined plane, termed a ramp for purposes of this disclosure. The ramp is attached to or part of the base and is positioned so that the end of the reaction arm contacts and moves up and down the ramp during working deflection of the system. In a preferred embodiment the ramp is arcuate in plan view with the center of the arc at the center of the stub shaft on which the spring element is mounted.

The working arm of the system is, in effect, a cantilever beam and operates in a plane perpendicular to the axis of the coil, i.e. parallel to the base. The reaction arm is also a cantilever beam; however, it operates in two directions. In one direction the end of the beam moves toward and away from the base; i.e. in plane parallel to the axis of the coil. In the other direction it operates in a plane perpendicular to the axis of the coil.

In the free state of the coil and its working and reaction arms, the working arm is positioned relative to the coil so that the arm must be deflected to wind up the coil and, when installed, the coil is under a desired preload in torsion. The torsion is equal to the force at the end of the arm multiplied by the distance of the end of the arm from the axis of the coil. The reaction arm is positioned so that it must (1) be moved parallel to the axis of the coil so that in the installed state it is preloaded a desired amount and is pressing on the ramp and (2) moved in a direction perpendicular to the axis of the coil such that it applies a torque to the coil equal and opposite to the torque applied by the working arm.

In use, when the working arm is further deflected, tending to increase the load at its end and the torque it applies by the coil, the end of the reaction arm moves up the ramp. The force of the end of the reaction arm on the sloped ramp surface in the direction parallel to the coil axis generates a force component on the end of that arm in a direction perpendicular to the axis of the coil. This force component, applied at the distance of the end of this arm from the center of the coil, provides a reaction torque equal to the torque applied by the working arm. This reaction torque remains constant to the extent that the force applied on the ramp by the end of the reaction arm remains constant. This force remains fairly constant, i.e. doesn't increase significantly as the end of the arm is further deflected away from the base as it moves up the ramp. If the force applied, and therefore the reaction torque, increases more than desired, the contour of the ramp can be made such that its slope decreases in the amount that the force increases so that the reaction force component remains essentially constant.

The friction between the end of the reaction arm and the ramp surface will increase the reaction force as the working arm is deflected in addition to its installation deflection and will decrease the reaction force as the working arm deflection is decreased. The surface of the ramp can be made so that the friction force is not significant, using techniques well known in the art. Also, constant force at the end of the working arm is necessary in many instances only during increasing deflection.

It should be noted that deflection of the end of the working arm is different from deflection of the coil. With the system functioning as described, the torsional deflection of the coil remains essentially constant during the working deflection of the system. It is this constant torsional deflection of the coil which provides the desired constant force at the end of the working arm.

The invention is described in more detail below with reference to the attached drawings.

DETAILED DESCRIPTION OF THE INVENTION

Figure 1:
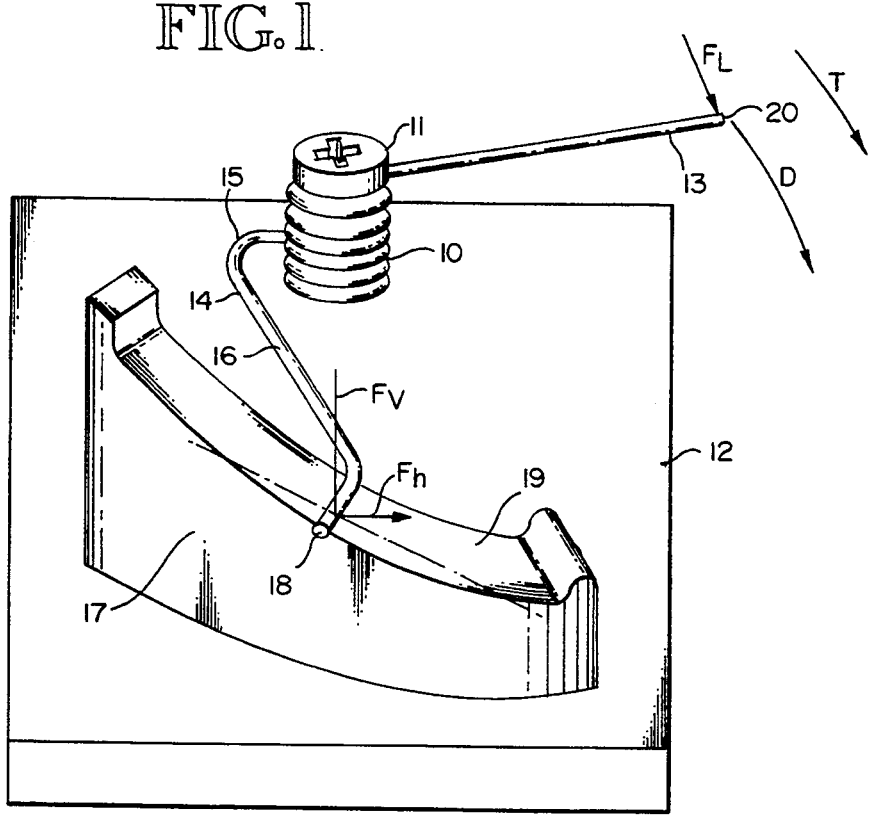
FIG. 1 is a perspective, schematic illustration of one embodiment of the subject system.

The subject invention is a constant force spring system. That is, the force required to deflect the force delivery portion of the system within its working range is essentially constant relative to the amount of deflection. One embodiment of the system is shown schematically in FIG. 1. Coil spring 10 is mounted on screw 11 which is threaded into base 12. Arm 13, a portion of the wire of the coil spring extending from one of its ends, is termed the working arm. Arm 14, a portion of the spring wire extending from the other end of the coil spring is termed the reaction arm. Arm 14 extends generally tangentially to the cylindrical form of the coil and in a plane perpendicular to its axis. Arm 14 has a spiral portion 15 and a straight portion 16 and, in its free state, the straight portion is directed at an angle to a plane perpendicular to the axis of the coil and extending away from the coil. Ramp 17 is also attached to the base. As shown in FIG. 2, a plan view of the embodiment of FIG. 1, the ramp is arcuate, with the center of the arc at the center of the coil spring. When the coil spring is installed on the pin, the reaction arm is deflected toward and, preferably, into a plane perpendicular to the axis of the cylinder. As a result of this deflection, end 18 of arm 14 presses on surface 19 of the ramp with the force direction parallel to the axis of the coil spring. This force is labeled Fv. Because of the slope of the ramp surface force Fv produces a component force Fh in a direction lying in a plane perpendicular to the axis of the coil spring. A load force Fl applied to end 20 of arm 13 produces a torque tending to rotate the coil spring in the direction indicated by arrow T. This torque is reacted by and equal and opposite to the torque produced by force Fh acting at end 18 of arm 14.

The force Fl will be at a constant level as end 20 is moved through its working deflection range as indicated by arrow D to the extent that force Fv is constant as it moves through its deflection as indicated by arrow $D^1$. Fv will be fairly constant because the amount of deflection caused by the interaction of arm 14 and the ramp is small compared to the amount of deflection which is required to install the spring as described above. If this variation is not acceptable it can be compensated for by variation of the slope of the ramp so that it decreases as the force Fv increases since decreasing the slope will decrease the value of force Fh relative to the value of Fv, and vice versa.

Figure 2:
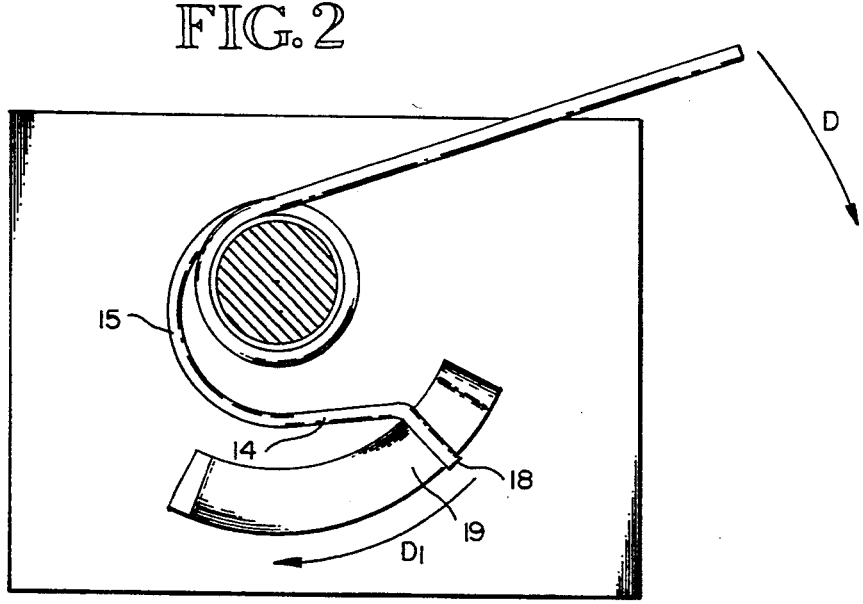
FIG. 2 is a plan view of the mechanism shown in FIG. 1
Figure 3:
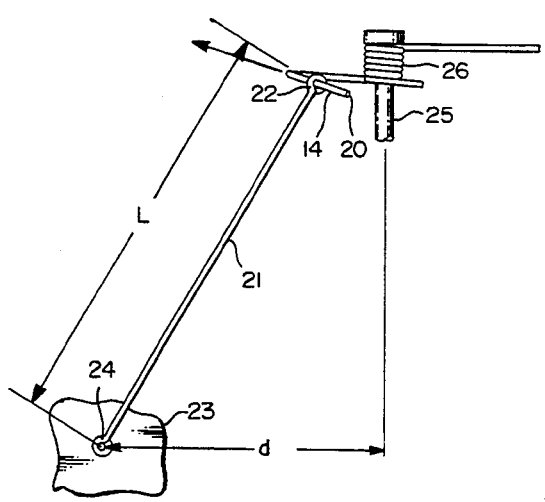
FIG. 3 is a schematic of a second embodiment of the subject invention using a pivoted link instead of a ramp to lift the end of the reaction arm.

Varying the slope of the ramp in this way causes it to resemble an arc as shown by the phantom line in FIG. 1. FIG. 3 illustrates an embodiment of the invention in which the ramp is replaced a link 21, one end 22 of which is pivotally attached to arm 14 near end 20 with the other end pivotally connected to base structure 23 at a point 24 located such that end 22 of the link and end 20 of arm 14 move in an arc as needed to provide force Fh at the needed values. The location of point 24 involves the length L of link 21 and distance d of the point from the axis of pin 25 on which coil spring 26 is mounted.

Figure 4:
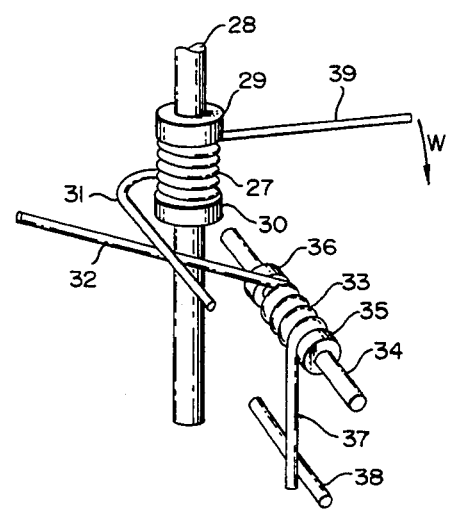
FIG. 4 is a schematic illustration of a third embodiment of the subject invention.

FIG. 4 schematically illustrates a third embodiment of the subject invention. Coil spring 27 is mounted on shaft 28 and positioned on the shaft by collars 29 and 30. Reaction arm 31 rides on arm 32 which extends from coil spring 33 mounted on shaft 34. Spring 33 is positioned on shaft 34 by collars 35 and 36. Arm 32 serves as the ramp of the system in this embodiment. Arm 37 extends from spring 33 and reacts the load on arm 32 by contact with fixed structure represented by stop pin 38. As work arm 39 on spring 27 is deflected in the direction indicated by arrow W, arm 31 moves up arm 32. As it does the force downward (in this view) increases and arm 32 deflects downward enough to change the slope of arm 32 to compensate for the increase in the downward force, as explained above.

Figure 5:
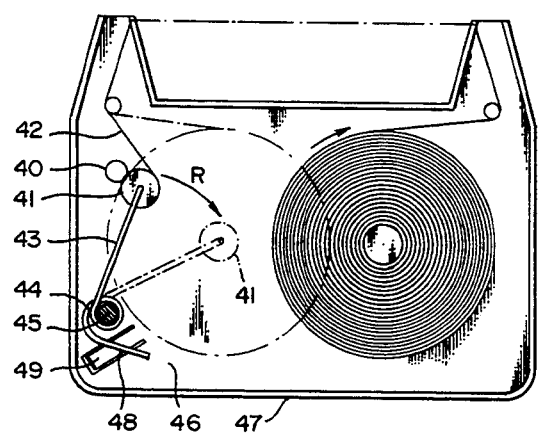
FIG. 5 is a schematic view showing a fourth embodiment of the subject invention adapted for use in a tape cartridge.

FIG. 5 schematically illustrates a tape cartridge incorporating a fourth embodiment of the subject invention. Driveshaft 40 drives take-up reel 41 for tape 42 by friction. As the diameter of the tape wound on reel 41 increases work arm 43 extending from coil spring 44 is deflected as indicated by arrow R. Spring 44 is mounted on stub shaft 45 which extends from base 46 of cartridge 47. Reaction arm 48 extending from spring 44 rides up ramp 49. With the system operating as described above, the contact force between shaft 40 and the tape on the take-up reel is essentially constant throughout the winding of the tape on reel 41.

Figure 6:
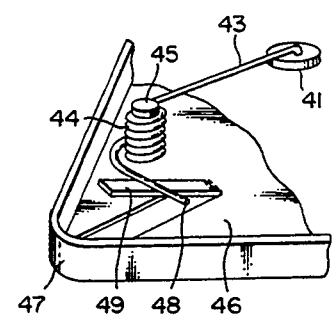
FIG. 6 illustrates the embodiment of FIG. 5 in more detail.

FIG. 6 illustrates in perspective and more detail the embodiment of the subject invention shown in FIG. 5. Ramp 49 is a tab cut from base 46 and bent and shaped to meet the requirements of the system. Identification numbers are the same as used in FIG. 5.

It is considered to be understandable from the above description that the subject invention meets its objectives. It provides a spring system which has an essentially flat rate (i.e. constant force) over its entire working deflection and is adaptable for use in film and tape cartridges.

It is also considered to be understood that while certain embodiments of the subject invention are disclosed herein, other embodiments and modifications of those described are possible within the scope of the invention which is limited only by the attached claims.

I claim:

1. A spring system comprising:
   a coil spring,
   a ramp,
   a pin and
   a base,
   said pine being attached to and extending from said base,
   said spring being installed on said pin and having first and second ends and an axis,
   said spring further comprising a first arm extending from said first end in a plane perpendicular to said axis and a second arm extending from said second end in a direction away from said coil and a plane perpendicular to said axis whereby moving said second arm into said plane perpendicular to said axis requires a first force applied in a direction parallel to said axis, said first force being reacted to by a second force applied by said second arm,
   said ramp having a surface having a slope angle and being positioned relative to said spring installed on said pin such that said second arm contacts said surface whereby said second force is applied to said surface, said slope angle being relative to a plane perpendicular to said axis and said ramp being configured and positioned relative to said spring such that said first force applied to said first arm applies a first torque to said spring tending to move said second arm up said surface, said first torque being reacted by a second torque produced by a third force which is a component of said second force, said third force being applied to said second arm in a plane perpendicular to said axis, thereby applying a second torque to said spring,
whereby said first torque caused by said first force applied to said first arm is equal and opposite to said second torque caused by application of said third force to said second arm and said first and second torques and said first and third forces are constant to the extent that said second force is constant, said third force being a function of the value of said second force and said slope angle.

2. The spring system of claim 1 in which said slope angle is varied such that variation of said slope angle compensates for variation in said second force, whereby said first and second torques and said first and third forces are rendered essentially constant.

* * * * *